United States Patent Office
3,441,818
Patented Apr. 29, 1969

3,441,818
"ON-OFF" SERVO SYSTEM WITH DEAD ZONE COMPENSATION AND MAGNETIC SERVO AMPLIFIERS
John R. Tiskus, Monroeville Borough, and Regis A. Vey, Ben Avon, Pa., assignors to United States Steel Corporation, a corporation of Delaware
Filed Sept. 21, 1965, Ser. No. 488,851
Int. Cl. G05f 1/46
U.S. Cl. 318—18                    21 Claims

ABSTRACT OF THE DISCLOSURE

A closed-loop controller is disclosed which includes an "On-Off" type servomechanism. The "On-Off" control consists of a pair of bi-stable magnetic amplifiers which control relays for actuating the servomotor in opposite directions. The servomotor is of the slow-speed type which is directly coupled to the load to eliminate a geartrain. The magnetic amplifiers include an adjustable bias to provide a "deadband" for stability purposes. Certain embodiments also include compensation circuitry to further enhance the "deadband" stability circuit.

---

This invention relates in general to a servo control system and more particularly to an entirely electrical controller for use with systems having relatively long response times.

It is common in many different types of processing and production systems to control the operating parameters of these systems by means of valves. For example, in the continuous casting of steel, the temperature of the casting is controlled by the flow rate of water sprayed on the casting as the casting is withdrawn from the mold. The flow rate (as measured by pressure at the spray nozzle) deviates from the desired flow rate, then an error signal is produced which can be used to initiate the operation of a controller that in turn determines the position of the valve and thus changes the rate of flow of water in order to bring the error signal to a minimum value. When the error signal is minimized, water is being sprayed on the casting at the desired rate.

In most industrial applications a pneumatic valve control is employed. Where the error in the operating characteristic that is ultimately being controlled is represented by the magnitude of an electrical signal, it becomes necessary to convert the error signal to a pneumatic signal. This conversion requires a transducer. Furthermore, any system having a pneumatic system together with an electrical system requires two entirely different types of power supplies.

Accordingly, it is one of the objects of this invention to provide an entirely electrical control system so as to reduce the complexity and expense of an electrical-pneumatic control system.

As a general rule, the electrical controllers which may be employed are expensive devices that entail not only large initial expense but also require an undesirable amount of maintenance. The known electrical valve actuators incorporate a servo motor to drive the valve and a gear train in order to reduce the servo motor speed to the relatively low speeds required in order to effect meaningful control over the valve position. Such servo systems generally hunt about particular points. At the points where hunting occurs, there is a tendency to localized wear in the gear train and thereby arises a maintenance problem.

Accordingly, it is a further major object of this invention to provide an entirely electrical controller which avoids incorporating either a servo motor or a gear train in applications wherein the valve may be positioned by direct connection to a slow-speed reversible motor.

It is a more specific object of this invention to provide a valve position controller which employs a slow-speed motor in order to position the valve.

It is a further object of this invention to achieve the above major objects in an embodiment which minimizes expense and maintenance and yet provides a high degree of control accuracy.

As will be seen from the detailed description of the invention, it is yet another object of this invention to provide a controller design that may readily be adapted to the control of operating systems which have a wide variety of response times as well as a wide variety of response characteristics.

In brief, this invention involves the employment of an "On-Off" type of control having a dead band area within which error signals will not initiate control action. Specifically, error signals below a predetermined absolute magnitude level will fail to initiate a control action thereby serving to avoid problems of hunting and stability.

A properly biased bi-stable magnetic amplifier is employed to respond to the error signal by providing a control signal output when the error signal has an absolute magnitude above the predetermined value. The magnetic amplifier output then energizes a relay which completes a circuit to a reversible motor that then adjusts the position of the valve stem.

A means is incorporated to take into account the time lag between the time when the desired valve position is attained and the time when the error signal drops to within the dead band. A bucking current is imposed on the secondary of the magnetic amplifier after the correcting signal has been made effective. The bucking current establishes a counter-flux that turns off the magnetic amplifier before the error signal has dropped to within the dead band and thus "anticipates" the system response to the correcting signal.

Other objects of this invention will become apparent from the following detailed description and the drawings, in which.

Figure 1:
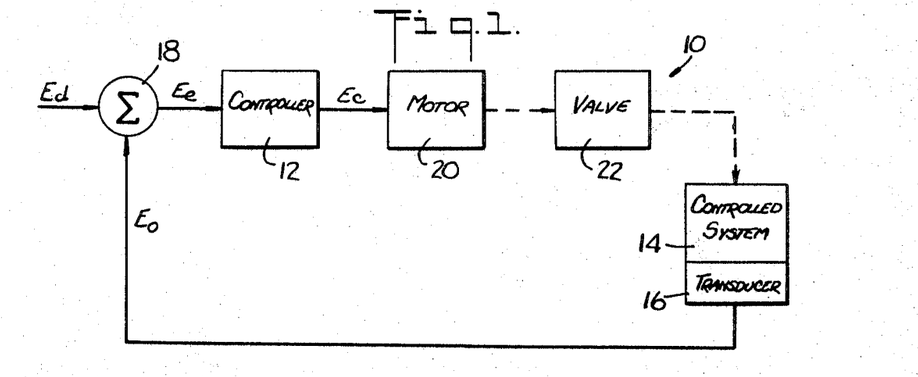
FIG. 1 is a block diagram of a system employing the controller of this invention.

FIG. 1 illustrates the servo system 10 within which the controller 12 of this invention operates. It will be convenient in discussing the operation of the servo loop 10 to consider the controlled system 14 as a cooling water spray system for use with a continuing casting process. The water sprays as is well known is used to cool the partially solidified casting. A transducer 16, which in this case might be a pressure transducer in the water spray header provides an electrical signal $E_o$ which has a magnitude that is a function of the water pressure in the header. An electrical signal $E_d$ is set by the operator to equal the transducer 16 output that would be obtained were the water pressure in the controlled system 14 of exactly the desired magnitude. The signal $E_d$, representing a desired water pressure, is compared with the signal $E_o$, representing the actual water pressure, by a comparator circuit 18 to provide an electrical error signal $E_e$ output. The comparator network 18 may be of any type well known in the art such as a well known bridge circuit.

The error signal $E_e$ actuates the controller 12 to provide a motor 20 control signal $E_c$ whose duration and polarity is a function of the magnitude and polarity of the error signal $E_e$. The motor control signal $E_c$ differs from the error signal $E_e$ in at least three respects.

First, the motor control signal $E_c$, when on, is nothing more than the power input to a motor 20, which may be a slow-speed reversible motor; thus the control signal $E_c$ does not vary in magnitude as does the error signal $E_e$. However, the control signal $E_c$ does switch phase or polarity when the error signal $E_e$ switches polarity so that the motor 20 will reverse direction to adjust the valve 22 in the proper direction. Furthermore, the controller 12 responds to the error signal $E_e$ in such a fashion as to provide a control signal $E_c$ whose duration is a function of the magnitude of the error signal $E_e$. Thus the larger the error signal $E_e$, the longer will the motor 20 be on and the greater will be the valve 22 adjustment.

The second respect in which the control signal $E_c$ differs from the error signal $E_e$ is that there is no control signal $E_c$ when the error signal $E_e$ is less than a certain predetermined absolute magnitude. Thus a dead band is created around zero so that small error signals $E_e$ do not generate a control signal $E_c$.

A third respect in which the control signal $E_c$ differs from the error signal $E_e$ is that they are not coincident in time. The control signal $E_c$ cuts off well before the error signal $E_e$ drops into the dead band so as to avoid over-correction.

Three embodiments are shown of a controller 12 which provides a control signal $E_c$ having the above-discussed relation to the error signal $E_e$.

Figure 2:
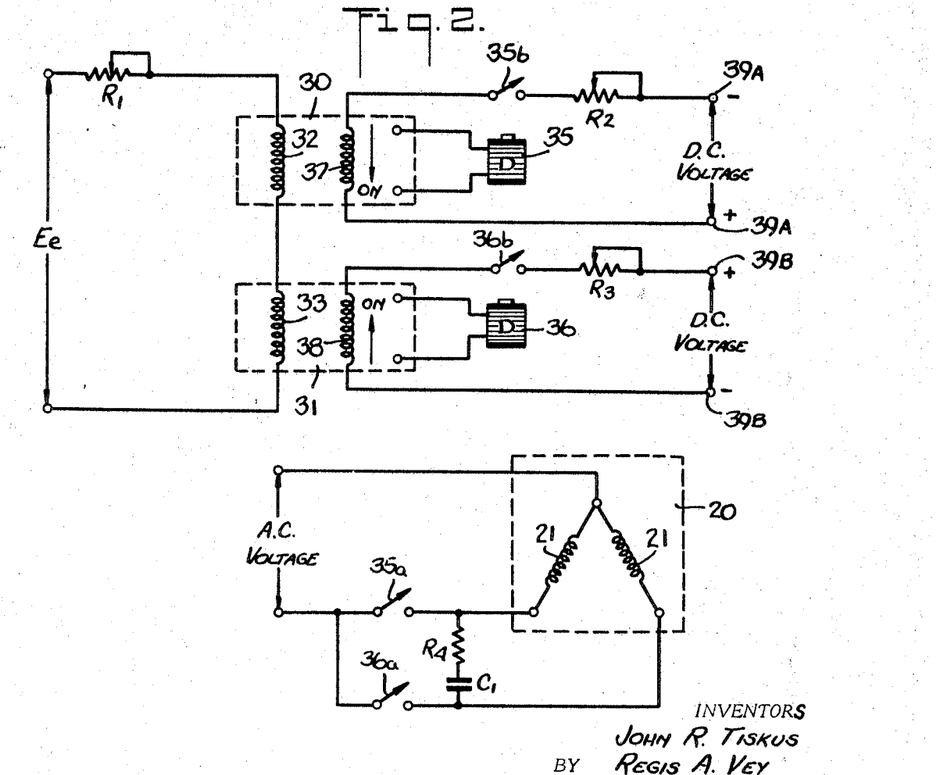
FIG. 2 is a schematic diagram of a first embodiment of the controller of this invention.
Figure 3:
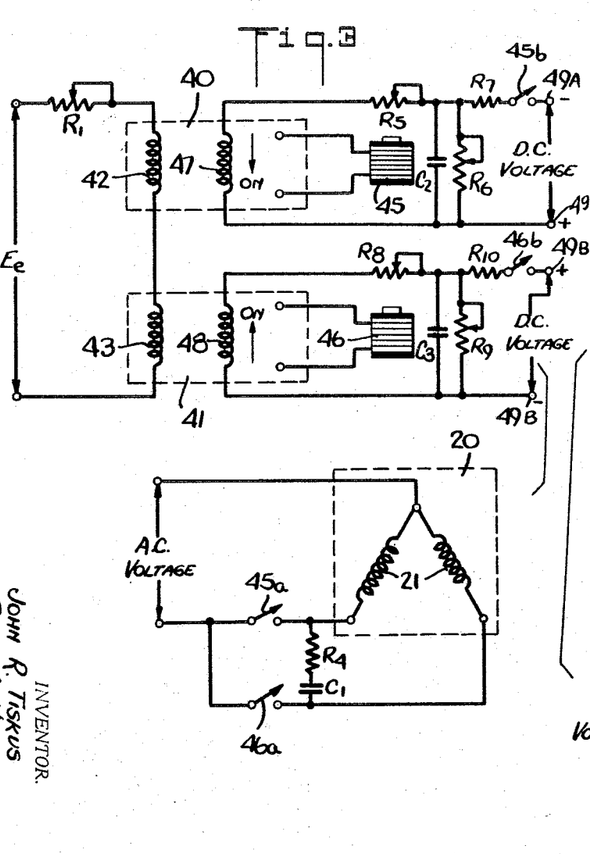
FIG. 3 is a schematic diagram of a second embodiment of the controller of this invention.
Figure 4:
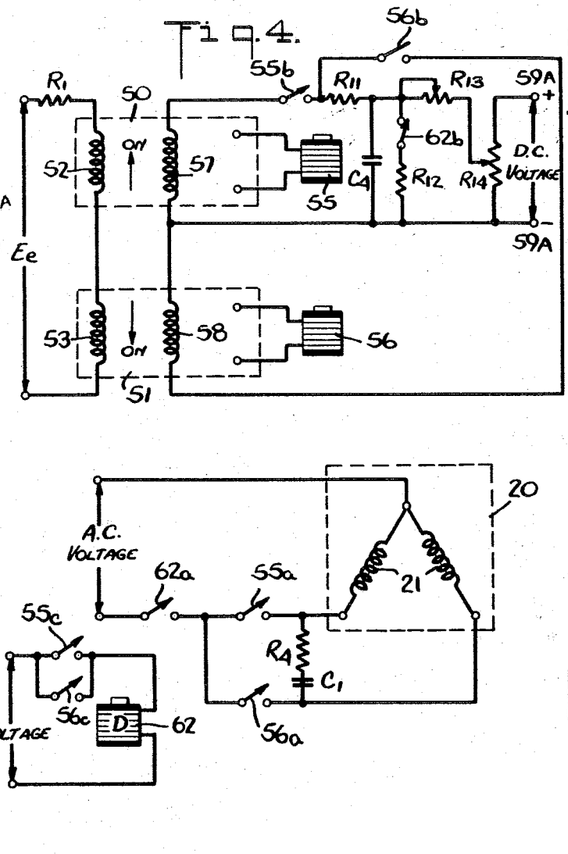
FIG. 4 is a schematic diagram of a third embodiment of the controller of this invention.

As will be seen from a consideration of FIGS. 2 through 4, the block diagram of FIG. 1 is something of an oversimplification. The controller 12 provides a signal $E_c$ which closes one of two relay contacts 35a or 36a to the motor 20. The relay contact which is closed determines the relative phase of the currents in two windings 21 and thus determines the direction in which the motor 20 will be made to rotate. The control signal $E_c$ has (1) a constant absolute magnitude, (2) a polarity that is a function of the error signal $E_e$ polarity, and (3) a duration that, as will be explained, is a function of error signal $E_e$ magnitude. It should also be realized that the valve 22 and transducer 16 are an integral part of the controlled system 14 but are broken out in FIG. 1 for purposes of the block diagram in order to make the sequence of events clearer. Thus it shall be understood that FIG. 1 is simply a first approximation of the system of this invention.

THE FIG. 2 EMBODIMENT

In the FIG. 2 embodiment, two separate bi-stable magnetic amplifiers 30 and 31 are coupled to the error signal $E_e$ through their respective control windings 32 and 33. The error signal $E_e$ is a DC signal which, when it has a first polarity, tends to turn on the magnetic amplifier 30 and when it has a second polarity, tends to turn on the magnetic amplifier 31. The direction of flux which tends to turn on the particular magnetic amplifier 30 or 31 is indicated by an arrow. $E_e$ is an error signal whose polarity depends upon whether the water pressure is too high or not high enough. When the water pressure is not high enough, the output from the transducer 16 (see FIG. 1) will be smaller than the desired output signal $E_d$ and the error signal $E_e$ will have a polarity such that it will turn on the magnetic amplifier 31 to energize the adjustable time delay relay 36. When the water pressure is too high, the error signal $E_e$ will have a polarity such that it tends to turn on the magnetic amplifier 30 which in turn energizes the adjustable time delay relay 35.

A dead band around a zero magnitude error signal is desirable to prevent hunting and overshooting. This dead band is obtained by a setting on the adjustable resistor R1. It is normally desirable to keep the dead band as small as possible in order to enhance the precision of the control.

If the water pressure is too high, it is desired to decrease the pressure. The error signal $E_e$ will turn on the magnetic amplifier 30 which will provide an output that turns on the adjustable time delay relay 35. When the relay 35 turns on, the contacts 35a close to energize the reversible motor 20 causing the motor 20 to rotate in a direction that adjusts the control valve 22 so as to decrease the water pressure.

However, if the water pressure is not high enough, it is then desired to decrease the water pressure. Under such condition, the error signal $E_e$ will have a polarity that turns on the magnetic amplifier 31 to provide an output that turns on the adjustable time delay relay 36. With the relay 36 turned on, the normally open contacts 36a close to so energize the motor 20 as to cause the motor 20 to rotate in a direction that adjusts the control valve 22 so as to decrease the water pressure.

One of the problems with a control system of the type described thus far in connection with FIG. 2 is that the water pressure does not change instantaneously in response to a change in the position of the valve 22. Thus it is necessary to build into the electrical system certain time delays or time advances to match the settling time (sometimes called response time) of the controlled system. If the water pressure is too high so that the relay 35 turns on to cause the valve stem to be rotated in a direction to increase the pressure, it is desired to stop the adjustment of the valve stem at some point prior to the time when the pressure reaches the desired magnitude and to hold the stem in position until the system settles. The problem arises out of the fact that the required valve position will have been achieved at a point in time before the water pressure is reduced to the desired magnitude since it will take considerable time for the water pressure to decrease in response to a change in valve position. This advance turn-off and hold is achieved in FIG. 2 by a combination of (1) a bucking DC current from the terminals 39A through the control winding 37 to develop a counter-flux that turns off the magnetic amplifier 30 when the error signal $E_e$ drops to a predetermined level, and (2) the time delay feature of the relay 35 which assures that the time period between successive correction signals $E_c$ will be at least equal to the settling time of the system being controlled.

The magnitude of the "turn-off" DC current, and thus of the counter-flux, is controlled by adjustment of the resistor R2 so as to turn off the magnetic amplifier 30 when the error signal $E_e$ has dropped to a predetermined magnitude outside of the dead band region. The predetermined $E_e$ magnitude at which the bucking current causes amplifier 30 turn-off is selected to be such that the correction of valve 22 position is normally made in one operation of the motor and thus with one large step change in $E_e$. If the initial error is sufficiently small so that the error signal $E_e$ developed is less than this predetermined $E_e$ magnitude, then the controller will cause the motor 20 to turn in small steps until the error drops to within the dead band. These small steps will occur because there is inevitable delay in magnetic amplifier 30 and relay 35 turn-off response. It may even be desirable under some circumstances to select components to assure a short turn-off delay.

Since the advance turn-off of the magnetic amplifier 30 will result in an unbalance in the system such that an error voltage $E_e$ will continue to obtain until the settling time has transpired, it becomes necessary to include some technique to prevent the relay 35 from turning on again during the settling time period. It is for this reason that the relay 35 is a time delay relay. It is set to have a time delay, before turning on, slightly greater than the settling time. After the magnetic amplifier 30 is turned off, there will continue to be an error signal $E_e$ sufficiently large to turn the magnetic amplifier 30 on again. But, because the relay 35 has a built-in time delay, the relay 35 itself will not turn on until after the system has had sufficient time to reach its settling point. If the adjustment of the valve 22 has been appropriate, then the error signal $E_e$ will drop to a point where the system is within the dead band and the time delay relay 35 will not then turn on since the magnetic amplifier will have been turned off by virtue of the drop in the magnitude of $E_e$. If, however, the adjustment has not been sufficient, then there will be an error signal $E_e$ remaining to cause the cycle or step to be repeated.

A completely similar arrangement is provided in connection with the magnetic amplifier 31 involving both (1) the application of a DC current from terminals 39B, having appropriate polarity, through an adjusting resistor R3 and a normally open contact 36b to the control winding 38 so as to establish a desired counter-flux, and (2) a time delay feature in the relay 36. As a normal rule, the time delay set for the adjustable time delay relay 36 will equal that for the time delay relay 35. However, it is conceivable that in certain controlled systems the settling time on a water pressure increase will be different than the settling time on a pressure decrease. This dictates different settings for the time delay in the two relays 35 and 36.

The resistor R4 capacitor C1 network at the input to the motor 20 windings 21 is included to provide the appropriate phase adjustment to cause the motor 20 to reverse in response to the closing of the appropriate contact 35a or 36a.

THE FIG. 3 EMBODIMENT

FIG. 3 is schematic illustration of a second embodiment of the invention. In FIG. 3, the error signal $E_e$ is fed to the control windings 42 and 43 of two separate bistable magnetic amplifiers 40 and 41. Magnetic amplifier 40 turns on in response to an error signal $E_e$ of a polarity representing too high a pressure and when turned on provides an output that energizes the relay 45. The relay 45, when energized, causes its contact 45a to close thereby causing the motor 20 to rotate in a direction which closes the valve 22. As a result, the water pressure decreases. This decrease in water pressure results in a reduction in the magnitude of the error signal $E_e$ to ultimately turn off the magnetic amplifier 40.

The magnetic amplifier 41 is so arranged as to turn on in response to an error signal $E_e$ having a polarity opposite to that which tends to turn on the magnetic amplifier 40. Thus the amplifier 41 is turned on and the relay 46 energized when it is desired to increase the water pressure. When the relay 46, which is connected across the output of the magnetic amplifier 41 is energized, its contact 46a closes thereby causing the motor 20 to turn in a direction that tends to open the valve 22 being controlled.

In FIG. 3, the means to compensate for the slow response time of the system being controlled includes (1) a counter-flux established by a DC current to cause the magnetic amplifiers 40, 41 to turn off when the error signal $E_e$ drops to a predetermined value, and (2) an RC network coupled to each of the magnetic amplifiers 40, 41 and having a time constant which substantially matches the settling time constant of the system being controlled.

As has been discussed in connection with the FIG. 2 embodiment, there will be considerable lag between the application of a correction signal adequate to bring the motor to a desired position and the desired water pressure change. Although a given change in valve position will result in a corresponding change of pressure, this change of pressure will not occur immediately but will take some period of time. Thus the motor 20 must be stopped before the error signal $E_e$ has dropped to within its dead band region in order to avoid over-correction. The counter-flux causes the correction of the motor 20 to cease at a error signal $E_e$ having a predetermined magnitude outside of the dead band region, which predetermined magnitude is selected as described in connection with FIG. 2.

Furthermore, it is important that the motor 20 not be turned on again until after the settling time of the system has passed. In FIG. 3, the RC time constant assures this result in the fashion described below.

When the relay 45 is energized (by the magnetic amplifier 40 having been turned on) the relay contact 45b closes so that DC current from the terminals 49A flows through the magnetic amplifier 40 control winding 47 in a direction that tends to turn the magnetic amplifier 40 off. The magnitude of the DC current flowing through the secondary winding 47 is controlled by adjustment of the resistor R5 so that the magnetic amplifier 40 is not turned off until the absolute magnitude of the error signal $E_e$ falls below a predetermined value. The variable resistor R5 is adjusted to control the level of the counter-flux producing bucking current and thus allow control over the value of $E_e$ at which the magnetic amplifier 40 will switch to its off state.

Once the magnetic amplifier 40 does turn off, the relay 45 will become de-energized and the contact 45b will open so that current from the terminals 49A will cease to flow. Since the error signal $E_e$ is at a predetermined value outside its dead band, the error signal $E_e$ has a magnitude sufficient to normally turn on the magnetic amplifier 40 again. However, a charge has been built up across the capacitor C2 during the period of time before the amplifier 40 turned off and this charge is discharged through the secondary winding 47 as a current which tends to oppose the effect of the error signal $E_e$ and thus maintains the magnetic amplifier 40 in an off state.

Specifically, the current in the winding 47 will decrease to zero exponentially as determined by the time constant $(R5)(R6)(C2)/R5+R6$. Concurrently, the magnitude of the error signal $E_e$ will decrease exponentially in accordance with the time constant of the controlled system. By proper adjustment of the resistor R6, the time constant of the current decline in the secondary winding 47 can be matched to the settling time constant of the system being controlled and thereby appropriately compensate for the time lag in the system being controlled.

An entirely similar arrangement is illustrated in connection with the magnetic amplifier 41 in which the time constant of the current decay through the secondary winding 48, when the magnetic amplifier 41 turns off, is matched to the time constant of the system being controlled by adjustment of the resistor R9. Resistor R8 performs the same function as does the resistor R5 and serves to adjust the level of the counter-flux producing DC current from the terminals 49B to whatever magnitude is required to cause the magnetic amplifier to turn off when the error signal $E_e$ drops below a desired predetermined absolute magnitude.

The resistors R7 and R10 provide an order of magnitude adjustment for the magnitude of the bucking current in windings 47 and 48, respectively, when relay contacts 45b or 46b close.

Because the resistors R6 and R9 are made substantially smaller than R5 and R8, respectively, the decay time constant is substantially (R6)(C2) and (R9)(C3), respectively. The decay time constants are then made essentially equal to the time constants of the controlled system by adjustments to resistors R6 and R9. As a general rule, the system response time to a given increase in the variable being controlled may differ from the system response time to a given decrease in the variable being controlled and thus might, under some circumstances be necessary to adjust the (R6)(C2) time constant to a different value than the (R9)(C3) time constant.

Thus it may be seen that the capacitors C2 and C3 in the FIG. 3 embodiment perform substantially the same function as does the time delay feature in the relays 35 and 36 in the FIG. 2 embodiment. This function is to prevent the motor 20 from being turned on again until after the settling time of the system has passed.

If the controlled-system pressure would respond instantaneously to changes in valve position, then the motor, a constant speed device, would change the pressure at a constant rate S when energized. However, the pressure in a controlled system that exhibits an essentially first order response characteristic will lag the motor by an amount equal to ST, where T is the time constant of the controlled system. Therefore, if R5 and R8 are adjusted so that the ampere turns in windings 47 or 48 (with contacts 45b or 46b closed) are equivalent to the ampere turns due to an error $E_e$ of ST, then the response of the control system will be essentially a single step correction.

THE FIG. 4 EMBODIMENT

A third embodiment of the system is illustrated in FIG. 4. The FIG. 4 embodiment has particular applicability to the control of systems wherein the speed of system response is extremely slow relative to the speed with which the motor can adjust the control valve. In FIG. 4, an adjustable time delay relay 62 is adjusted to have a time delay that is somewhat greater than the settling time of the system being controlled. In this sense, the embodiment of FIG. 4 has some similarity to the embodiment of FIG. 2.

However, unlike both of the previously described embodiments, the time period of each correction step in FIG. 4 is more proportional to the magnitude of the error signal $E_e$ than is the case in the embodiments of FIG. 2 and FIG. 3. In both the FIG. 2 and FIG. 3 embodiments, the correction step continues until the error signal $E_e$ has dropped to some predetermined value. This predetermined value is set low enough so that the error signal drops to within the dead band during the succeeding settling time period. By contrast, the FIG. 4 embodiment provides a series of corrective adjustments, each adjustment being proportional to the magnitude of the initiating error signal.

In operation, the FIG. 4 embodiment functions as follows. If the water pressure becomes too high, an error signal $E_e$ is generated with a polarity that turns on the bistable magnetic amplifier 50. The magnetic amplifier 50 output then energizes relay 55 to close normally open contacts 55a, 55b and 55c. The closing of contact 55c energizes the adjustable time delay relay 62. However, the time delay relay 62 has a delayed starting time so that the normally open contact 62a remains open for a predetermined time period. Although the closing of the contact 55b would appear to permit a buckling current to pass through the control winding 57 of the magnetic amplifier 50 so as to turn off the magnetic amplifier 50, this does not immediately occur because the resistor R12 acts as a current bypass. The R12 resistance is selected to be sufficiently less than the R11 and R14 resistances so that the bulk of the current supplied from the terminals 59A is bypassed through the resistor R12 and there is insufficient bucking current passing through the secondary winding 57 to cause the magnetic amplifier 50 to turn off.

However, after the predetermined time period set by the time delay relay 62 has passed, the contact 62a closes to energize the motor 20 and cause the motor 20 to begin turning in a direction suitable to reduce the magnitude of the error signal $E_e$. At the same time, the contact 62b opens thereby disconnecting the bypassing resistor R12 and permitting sufficient current to flow through the winding 57 in a direction tending to return the amplifier 50 to its "off" state. The amplifier 50 does not immediately turn off because the initial surge of current is employed to charge the capacitor C4. The current in the winding 57 increases in accordance with an exponential equation that is a function of the magnitude of the capacitor C4 as well as the magnitude of the various resistors employed in the associated circuitry. The magnitude of the resistor R14 (as well as the magnitude of the resistance of the winding 57 itself) is selected to be very small compared with the magnitude of the resistors R11 and R13. With the resistors having such a relationship, the current in the winding 57 may be expressed by the following equation:

$$i = \frac{V}{k_1}[1 - \epsilon^{-k_2 t}]$$

wherein:
$i$=the instantaneous value of the current in the winding 57 after contact 62b is opened
$V$=the magnitude of the voltage at the tap of the resistor 14
$k1 = R11 + R13$
$k2 = (R11 + R13)/(R11)(R13)(R4)$ Obviously, by selection of the tap on the resistor R14 and by selection of the resistors R11 and R13, as well as selection of the capacitor C4, not only can any desired time constant be selected to govern the rate at which the bucking current in the winding 57 rises, but the magnitude to which the bucking current in the winding 57 rises during the time constant selected can be controlled.

Selection of the magnitude of the voltage V by positioning the tap on the resistor R14 permits operator control over the magnitude of the bucking current in the winding 57 at the end of a time period equal to the time constant $k2$ above. Furthermore, selection of the magnitude of the capacitor C4 and of the resistors R11 and R13 permits control over the magnitude of the time constant $k2$. In this fashion, the time it will take for the bucking current to increase sufficiently to override the error signal and turn off the magnetic amplifier 50 will be in part a function of the magnitude of the error signal $E_e$.

Once the bucking current has increased to a point where the amplifier 50 is turned off and consequently the relay 55 de-energized, the contact 55a will open and the motor 20 will stop. Since the contact 55b simultaneously opens, the bucking current through the winding 57 will cease and the error signal $E_e$ will tend to turn on the amplifier 50. However, when the amplifier 50 turns on again and the relay 55 is re-energized so that all of the contacts 55a, 55b and 55c close again, the motor 20 will not be turned on for a time period at least equal to that predetermined time which has been set into the time delay relay 62. This is so because the re-energization of the relay 62 by the closing of the contact 55c will not result in a closing of the contact 62a for this predetermined time period. The time delay set into the relay 62 is made slightly greater than the settling time of the system so the next corrective action will be in response to an error signal $E_e$ that represents the steady-state condition of the system.

When the pressure becomes too low, the operation of FIG. 4 is essentially similar to that just described except that the magnetic amplifier 51 and its associated relay 56 become operative to cause the opposite rotation of the motor 20.

In practice, R13 is made much smaller than R11 so that the current in winding 57 or 58 when normally closed contacts 62b open is essentially:

$$i = \frac{V}{R_{11}}[1 - \epsilon^{-\frac{1}{R_{13}C_4}t}]$$

V is chosen such that $V/R11$ times the number of turns in winding 57 or 58 is much greater than the maximum number of ampere turns that could possible be due to $E_e$. This ensures that the amount of correction applied by the motor 20 during each step of the correction process will be essentially linearly related to the magnitude of the error signal $E_e$. R13 is used, in conjunction with C4, to adjust the amount of correction applied to the system (motor on-time) for a given magnitude of error signal $E_e$. Also, the delay time of relay 62 is adjusted to be slightly greater than the settling time of the controlled system.

IN GENERAL

It might assist in comprehending the nature of the three embodiments shown to briefly compare their operation. As may be seen from the above description of three embodiments, all of the controllers essentially involve a technique for applying a counter-flux to the flux that turns on the magnetic amplifier so as to turn off the magnetic amplifier before the error signal has dropped into the dead band area. But, once the magnetic amplifier has turned off, this counter-flux must be removed in time to permit further response to an error signal once the system has responded to the correction. Accordingly, all of the embodiments disclosed also provide for some means to hold the actuating relays off for a period of time equal to the settling time.

In all three cases, an anticipatory time delay is built into the system so that after a corrective step has been taken, the controller will remain off for a period of time that is at least equal to the settling time of the system. In two cases (FIG. 2 and FIG. 4) the time period between corrective steps is established by means of a time delay set into time delay relays. In one case (FIG. 3) the time period between corrective steps is established by means of an exponential RC time constant which is designed to match the settling time constant of the system being controlled.

Two of the embodiments (FIG. 2 and FIG. 3) cause the corrective step to be applied for as long as necessary to drop the error signal $E_e$ to a predetermined value. At the predetermined $E_e$ value, the counter-flux caused to flow in the windings of the magnetic amplifiers involved turns the controller off. The third embodiment (FIG. 4) causes a proportional corrective action to be applied; namely, the amount of the correction is a function of the error signal $E_e$. In the case of FIG. 4, this relation is achieved by causing the counter-flux to exponentially increase as a function of an RC time constant.

Thus the FIG. 2 and FIG. 3 embodiments are designed to provide a single step corrective action in response to any size error signal. This single step drops the error signal to a predetermined value and then holds the controller in an off state for a period of time equal to the settling time of the system. When the initiating error signal is less than the predetermined value (which predetermined value, it must be remembered, is outside of dead band range) then the time period of each correction step equals the time it takes for the magnetic amplifiers and relays involved to turn off. The FIG. 4 controller design is such that a series of corrective steps are taken in response to any given error signal $E_e$. Each corrective step is proportional to the magnitude of the initiating error signal and the over-all control action is similar to that of a sampled-data controller where the error signal is sampled at intervals somewhat greater than the settling time of the controlled system, with proportional corrective action applied when necessary.

The FIG. 3 controller is particularly applicable to control systems having a single settling time constant, which time constant can be approximately matched by an RC time constant. The FIG. 2 controller has more general applicability and is useful to control systems having time constants of any order. The FIG. 4 controller is particularly adapted to control systems having relatively long settling times as earlier explained.

This invention has been described in connection with three specific embodiments to give some concept of the scope of the invention. Other variations could be made by one skilled in the art without departing from the scope of the invention.

We claim:

1. In a servo system wherein a motor is employed to control a parameter of a controlled system and wherein an error signal is provided to indicate the magnitude and direction of deviation of said parameter from a desired magnitude, the improvement of a controller comprising:
   (a) a first magnetic amplifier coupled to said error signal such that said first magnetic amplifier will be turned on by an error signal having a first polarity and having an absolute magnitude greater than a first predetermined value,
   (b) a second magnetic amplifier coupled to said error signal such that said magnetic amplifier will be turned on by an error signal having a second polarity and having an absolute magnitude greater than a second predetermined value,
   (c) a first relay coupled to the output of said first amplifier to be energized when said first amplifier is turned on,
   (d) first power means responsive to the energization of said first relay to turn said motor in a first direction during at least a portion of the time when said first relay is energized, the rotation of said motor in said first direction being such as would decrease the magnitude of an error signal having a first polarity,
   (e) a second relay coupled to the output of said second amplifier to be energized when said second amplifier is turned on,
   (f) second power means responsive to the energization of said second relay to turn said motor in a second direction during at least a portion of the time when said second relay is energized, the rotation of said motor in said second direction being such as would decrease the magnitude of an error signal having a second polarity,
   (g) first bias means responsive to the energization of said first relay to bias off said first amplifier after said first relay has been energized,
   (h) second bias means responsive to the energization of said second relay to bias off said second amplifier after said second relay has been energized,
   (i) first time delay means responsive to the coupling of either of said bias means to either of said amplifiers to maintain said motor turned off for a first predetermined time period after said motor has been turned off by the turning off of one of said amplifiers.

2. The controller of claim 1 further characterized by a second time delay means responsive to the magnitude of said error signal to maintain said motor turned on for a second predetermined time period after said motor has been turned on, said second predetermined time period being a function of the absolute magnitude of said error signal.

3. In a servo system wherein a motor is employed to control a parameter of a controlled system and wherein an error signal is provided to indicate the magnitude and direction of deviation of said parameter from a desired magnitude, the improvement of a controller comprising:
   (a) a first magnetic amplifier coupled to said error signal such that said first magnetic amplifier will be turned on by an error signal having a first polarity and having a magnitude greater than a first predetermined value,
   (b) a second magnetic amplifier coupled to said error signal such that said second magnetic amplifier will be turned on by an error signal having a second polarity and having a magnitude greater than a second predetermined value,
   (c) first switching means having a first state and a second state and responsive to the output of said first amplifier to be switched into its second state a first predetermined time period after said first amplifier has been turned on,
   (d) first power means responsive to said second state of said first switching means to turn said motor in a first direction when said first switching means is switched into its second state, the rotation of said motor in said first direction being such as would decrease the magnitude of an error signal having a first polarity,
   (e) second switching means having a first state and a second state and responsive to the output of said second amplifier to be switched into its second state a second predetermined time period after said second amplifier has been turned on,
   (f) second power means responsive to said second state of said second switching means to turn said motor in a second direction when said second switching means is switched into its second state, the rotation of said motor in said second direction being such as would decrease the magnitude of an error signal having a second polarity, (g) a source of bias current sufficient, when coupled to either of said magnetic amplifiers, to turn off either of said magnetic amplifiers when said error signal has an absolute magnitude less than a third predetermined value, said third predetermined value being greater than either said first or said second predetermined values, (h) first coupling means responsive to said second state of said first switching means to couple said bias current to said first amplifier when said first switching means has been switched into its second state whereby said first amplifier will be turned off when said first switching means is in its second state and said error signal has an absolute magnitude less than said third predetermined value, and (i) second coupling means responsive to said second state of said second switching means to couple said bias current to said second amplifier when said second switching means has been switched into its second state, whereby said second amplifier will be turned off when said second switching means is in its second state and said error signal has an absolute magnitude less than said third predetermined value.

4. In a servo system wherein a motor is employed to control a parameter of a controlled system and wherein an error signal is provided to indicate the magnitude and direction of deviation of said parameter from a desired magnitude, the improvement of a controller comprising:

(a) a tri-stable amplifier having an off state, a first on state and a second on state, said amplifier being adapted to be coupled to said error signal so that an error signal having a first polarity and an absolute magnitude greater than a first predetermined value will switch said amplifier into said first on state and an error signal having a second polarity and an absolute magnitude greater than a second predetermined value will switch said amplifier into said second on state, (b) first switching means having a first state and a second state, said first switching means being responsive to said first on state of said amplifier to be switched into its second state when said amplifier switches into said first on state, (c) first power means responsive to said second state of said first switching means to turn said motor in a first direction when said first switching means is switched into its second state, the rotation of said motor in said first direction being such as would decrease the magnitude of an error signal having a first polarity, (d) second switching means having a first state and a second state, said second switching means being responsive to said second on state of said amplifier to be switched into its second state when said amplifier has been switched into said second on state, (e) second power means responsive to said second state of said second switching means to turn said motor in a second direction when said second switching means is switched into its second state, the rotation of said motor in said second direction being such as would decrease the magnitude of an error signal having a second polarity, (f) bias means adapted to switch said amplifier into said off state when said error signal has an absolute magnitude less than a third pre-determined value said third predetermined value being greater than either said first or said second predetermined values, (g) coupling means responsive to said second states of said first and said second switching means to couple said bias means to said amplifier when either of said switching means has been switched into its second state, whereby said amplifier will be switched into said off state when either of said switching means is in its second state and said error signal has an absolute magnitude less than said third predetermined value, and (h) time delay means coupled to said amplifier and responsive to the coupling of said bias means to said amplifier to maintain said amplifier in said off state for at least a first predetermined time period after said bias means has switched said amplifier into said off state.

5. The controller of claim 4 wherein said time delay means includes a capacitor coupled to said amplifier such that the coupling of said bias means to said amplifier serves to charge up said capacitor so that on a subsequent decoupling of said bias means a charge will be left on said capacitor having a polarity that will tend to maintain said amplifier in said off state.

6. In a servo system wherein a motor is employed to control a parameter of a controlled system and wherein an error signal is provided to indicate the magnitude and direction of deviation of said parameter from a desired magnitude, the improvement of a controller comprising:

(a) a first magnetic amplifier coupled to said error signal such that said first magnetic amplifier will be turned on by an error signal having a first polarity and having an absolute magnitude greater than a first predetermined value, (b) a second magnetic amplifier coupled to said error signal such that said magnetic amplifier will be turned on by an error signal having a second polarity and having an absolute magnitude greater than a second predetermined value, (c) first switching means having a first state and a second state and responsive to the output of said first amplifier to be switched into its second state when said first amplifier is turned on, (d) first power means responsive to said second state of said first switching means to turn said motor in a first direction when said first switching means is switched into its second state, the rotation of said motor in said first direction being such as would decrease the magnitude of an error signal having a first polarity, (e) second switching means having a first state and a second state and responsive to the output of said second amplifier to be switched into its second state when said second amplifier is turned on, (f) second power means responsive to said second state of said second switching means to turn said motor in a second direction when said second switching means is switched into its second state, the rotation of said motor in said second direction being such as would decrease the magnitude of an error signal having a second polarity, (g) a source of bias current sufficient, when coupled to either of said magnetic amplifiers, to turn off either of said magnetic amplifiers when said error signal has an absolute magnitude less than a third predetermined value, said third predetermined value being greater than either said first or said second predetermined values, (h) first coupling means responsive to said second state of said first switching means to couple said bias current to said first amplifier when said first switching means has been switched into its second state whereby said first amplifier will be turned off when said first switching means is in its second state and said error signal has an absolute magnitude less than said third predetermined value, (i) second coupling means responsive to said second state of said second switching means to couple said bias current to said second amplifier when said second switching means has been switched into its second state, whereby said second amplifier will be turned off when said second switching means is in its second state and said error signal has an absolute magnitude less than said third predetermined value, and (j) time delay means coupled to both of said amplifiers and responsive to the coupling of said bias current to either of said amplifiers to maintain, whichever of said amplifiers has been turned off by said bias current, turned off for a first predetermined time period.

7. The controller of claim 6 wherein said time delay means includes a first capacitor coupled to said first amplifier and a second capacitor coupled to said second amplifier such that the coupling of said bias means to either of said amplifiers will serve to charge up the corresponding one of said capacitors so that on a subsequent decoupling of said bias means a charge will be left on said corresponding one of said capacitors having a polarity that will tend to maintain the corresponding one of said amplifiers turned off.

8. In a servo system wherein a motor is employed to control a parameter of the controlled system and wherein an error signal is provided to indicate the magnitude and direction of deviation of said parameter from a desired magnitude, the improvement of a controller comprising:

(a) a tri-stable amplifier having an off state, a first on state and a second on state, said amplifier being adapted to be coupled to said error signal so that an error signal having a first polarity and an absolute magnitude greater than a first predetermined value will switch said amplifier into said first on state and an error signal having a second polarity and an absolute magnitude greater than a second predetermined value will switch said amplifier into said second on state, (b) first switching means having a first state and a second state and being responsive to said first on state of said amplifier to be switched into its second state when said amplifier is switched into said first on state, (c) second switching means having a first state and a second state and being responsive to said second on state of said amplifier to be switched into its second state when said amplifier is switched into said second on state, (d) third switching means having a first state and a second state and being responsive to said second states of said first and said second switching means to be switched into its second state a predetermined time period after either of said first or said second switching means have been switched into their second state, (e) first power means responsive to said second states of said first and said third switching means to turn said motor in a first direction when said first and said third switching means are both switched into their second states, the rotation of said motor in said first direction being such as would decrease the magnitude of an error signal having a first polarity, (f) second power means responsive to said second states of said second and said third switching means to turn said motor in a second direction when said second and said third switching means are both switched into their second states, the rotation of said motor in said second direction being such as would decrease the magnitude of an error signal having a second polarity, (g) bias means adapted to provide a signal sufficient to switch said amplifier into said off state, (h) a charging capacitor, and (i) coupling means responsive to said second states of said third switching means to couple said capacitor to said bias means and to said amplifier to cause said bias means to charge said capacitor to a point sufficient to switch said amplifier into said off state when said third switching means is switched into its second state.

9. In a servo system wherein a motor is employed to control a parameter of a controlled system and wherein an error signal is provided to indicate the magnitude and direction of deviation of said parameter from a desired magnitude, the improvement of a controller comprising:

(a) a first magnetic amplifier coupled to said error signal such that said first magnetic amplifier will be turned on by an error signal having a first polarity and having a magnitude greater than a first predetermined value, (b) a second magnetic amplifier coupled to said error signal such that said magnetic amplifier will be turned on by an error signal having a second polarity and having a magnitude greater than a second predetermined value, (c) first switching means having a first state and a second state and responsive to the output of said first amplifier to be switched into its second state when said first amplifier is turned on, (d) second switching means having a first state and a second state and responsive to the output of said second amplifier to be switched into its second state when said second amplifier is turned on, (e) third switching means having a first state and a second state and being responsive to said second states of said first and said second switching means to be switched into its second state a predetermined time period after either of said first or said second switching means have been switched into their second state, (f) first power means responsive to said second states of said first and said third switching means to turn said motor in a first direction when said first and said third switching means are both switched into their second states, the rotation of said motor in said first direction being such as would decrease the magnitude of an error signal having a first polarity, (g) second power means responsive to said second states of said second and said third switching means to turn said motor in a second direction when said second and said third switching means are both switched into their second states, the rotation of said motor in said second direction being such as would decrease the magnitude of an error signal having a second polarity, (h) a source of bias current sufficient to turn off either of said magnetic amplifiers, (i) first coupling means responsive to said second states of said first switching means to couple said sources to said first magnetic amplifier when said first switching means has switched into its second state, (j) second coupling means responsive to said second state of said second switching means to couple said source to said second amplifier when said second switching means has switched into its second state, (k) a loading resistor having a resistance sufficiently low so that it will serve to load down said source of bias current, when coupled across said source, to prevent said source from turning either of said amplifiers off, (l) third coupling means responsive to said first state of said third switching means to couple said resistor across said source when said third switching means is in its first state, and (m) a charging capacitor connected across said source of bias current whereby the uncoupling of said resistor from said source serves to charge said capacitor to a point sufficient to turn off whichever of said amplifier is coupled to said source.

10. The controller of claim 9 wherein said predetermined time period associated with said third switching means is at least equal to the time lag between a change in the position of said motor and the corresponding change in the value of said parameter.

11. In a servo system wherein a motor is employed to control a parameter of a controlled system and wherein an error signal is provided to indicate the magnitude and direction of deviation of said parameter from a desired magnitude, the improvement of a controller comprising:

(a) a tri-stable amplifier having an off state, a first on state and a second on state, said amplifier being adapted to be coupled to said error signal so that an error signal having a first polarity and an absolute magnitude greater than a first predetermined value will switch said amplifier into said first on state and an error signal having a second polarity and an absolute magnitude greater than a second predetermined value will switch said amplifier into said second on state, (b) a first time delay relay coupled to said first on state of said amplifier and having first and second normally open contacts, said first relay becoming energized when said amplifier is switched into said first on state to close said first and second contacts a first predetermined time period after said amplifier has switched into said first on state, (c) a second time delay relay coupled to said second on state of said amplifier and having third and fourth normally open contacts, said second time delay relay becoming energized when said amplifier is switched into said second on state to close said third and fourth contacts a second predetermined time period after said amplifier has switched into said second on state, (d) a source of power adequate to turn on said motor, said first normally open contact being connected between said motor and said source of power so as to cause said motor to turn in a first direction when said first contact is closed, said third normally open contact being connected between said source of power and said motor so as to cause said motor to turn in a second direction when said third contact is closed, the rotation of said motor in said first direction being such as would decrease the magnitude of an error signal having a first polarity and the rotation of said motor in said second direction being such as would decrease the magnitude of said error signal having a second polarity, and (e) bias means adapted to switch said amplifier into said off state when said error signal has an absolute magnitude less than a third predetermined value, said third predetermined value being greater than either said first or said second predetermined values, said second and said fourth normally open contacts being connected between said bias means and said amplifier such that the closing of either said second or said fourth contacts will couple said bias means to said amplifier to switch said amplifier into said off state when said error signal has an absolute magnitude less than said third predetermined value.

12. In a servo system wherein a motor is employed to control a parameter of a controlled system and wherein an error signal is provided to indicate the magnitude and direction of deviation of said parameter from a desired magnitude, the improvement of a controller comprising:

(a) a first magnetic amplifier coupled to said error signal such that said first magnetic amplifier will be turned on by an error signal having a first polarity and having a magnitude greater than a first predetermined value, (b) a second magnetic amplifier coupled to said error signal such that said second magnetic amplifier will be turned on by an error signal having a second polarity and having a magnitude greater than a second predetermined value, (c) a first time delay relay coupled to the output of said first magnetic amplifier and having first and second normally open contacts, said first and second contacts becoming closed a first predetermined time period after said first magnetic amplifier is turned on, (d) a second time delay relay coupled to the output of said second magnetic amplifier and having third and fourth normally open contacts, said third and fourth contacts becoming closed a second predetermined time period after said second amplifier is turned on, (e) a source of power adequate to turn on said motor, said first normally open contact being connected between said motor and said source of power so as to cause said motor to turn in a first direction when said first contact is closed, said third normally open contact being connected between said source of power and said motor so as to cause said motor to turn in a second direction when said third contact is closed, the rotation of said motor in said first direction being such as would decrease the magnitude of an error signal having a first polarity and the rotation of said motor in said second direction being such as would decrease the magnitude of said error signal having a second polarity, and (f) a source of bias current sufficient, when coupled to either of said magnetic amplifiers, to turn off either of said magnetic amplifiers when said error signal has an absolute magnitude less than a third predetermined value, said third predetermined value being greater than either said first or said second predetermined values, said second normally open contact being connected between said source of bias and said first magnetic amplifier to apply a turn off bias to said first magnetic amplifier when said second contact closes, said fourth normally open contact being connected between said source of bias and said second magnetic amplifier to apply a turn off bias to said second magnetic amplifier when said fourth contact closes.

13. The controller of claim 12 wherein said first and said second predetermined time periods associated with said first and said second time delay relays, respectively, are each at least equal to the time lag between a change in the position of said motor and the corresponding change in the value of said parameter.

14. In a servo system wherein a motor is employed to control a parameter of a controlled system and wherein an error signal is provided to indicate the magnitude and direction of deviation of said parameter from a desired magnitude, the improvement of a controller comprising:

(a) a tri-stable amplifier having an off state, a first on state and a second on state, said amplifier being adapted to be coupled to said error signal so that an error signal having a first polarity and an absolute magnitude greater than a first predetermined value will switch said amplifier into said first on state and an error signal having a second polarity and an absolute magnitude greater than a second predetermined value will switch said amplifier into said second on state, (b) a first relay coupled to said first said on state of said amplifier and having first and second normally open contacts, said first relay becoming energized to close said first and said second contacts when said amplifier is switched into said first on state, (c) a second relay coupled to said second on state of said amplifier and having third and fourth normally open contacts, said second relay becoming energized to close said third and said fourth contacts when said amplifier is switched into said second on state, (d) a source of power adequate to turn on said motor, said first normally open contact being connected between said motor and said source of power so as to cause said motor to turn in a first direction when said first contact is closed, said third normally open contact being connected between said source of power and said motor so as to cause said motor to turn in a second direction when said third contact is closed, the rotation of said motor in said first direction being such as would decrease the magnitude of an error signal having a first polarity and the rotation of said motor in said second direction being such as would decrease the magnitude of said error signal having a second polarity, (e) bias means adapted to switch said amplifier into said off state when said error signal has an absolute magnitude less than a third predetermined value, said third predetermined value being greater than either said first or said second predetermined values, said second and said fourth normally open contacts being connected between said bias means and said amplifier such that the closing of either of said second or said fourth contacts will couple said bias means to said amplifier to switch said amplifier into said off state when said error signal has an absolute magnitude less than said third predetermined value, and (f) time delay means coupled to said amplifier and responsive to the closing of either of said second or said fourth contacts to maintain said amplifier in said off state for at least a first predetermined time period after said bias means has switched said amplifier into said off state.

15. The controller of claim 14 wherein said time delay means includes a capacitor coupled to said amplifier, the closing of either of said second or said fourth contacts serving to couple said bias means to said capacitor to charge up said capacitor so that on a subsequent opening of said second or said fourth contact a charge will be left on said capacitor having a polarity that will tend to maintain said amplifier in said off state.

16. In a servo system wherein a motor is employed to control a parameter of a controlled system and wherein an error signal is provided to indicate the magnitude and direction of deviation of said parameter from a desired magnitude, the improvement of a controller comprising:

(a) a first magnetic amplifier coupled to said error signal such that said first magnetic amplifier will be turned on by an error signal having a first polarity and having an absolute magnitude greater than a first predetermined value, (b) a second magnetic amplifier coupled to said error signal such that said magnetic amplifier will be turned on by an error signal having a second polarity and having an absolute magnitude greater than a second predetermined value, (c) a first relay coupled to the output of said first magnetic amplifier and having first and second normally open contacts, said first relay becoming energized to close said first and said second contacts when said first magnetic amplifier is turned on, (d) a second relay coupled to the output of said second magnetic amplifier and having a third and fourth normally open contacts, said second relay becoming energized to close said third and said fourth contacts when said second amplifier is turned on, (e) a source of power adequate to turn on said motor, said first normally open contact being connected between said motor and said source of power so as to cause said motor to turn in a first direction when said first contact is closed, said third normally open contact being connected between said source of power and said motor so as to cause said motor to turn in a second direction when said third contact is closed, the rotation of said motor in said first direction being such as would decrease the magnitude of an error signal having a first polarity and the rotation of said motor in said second direction being such as would decrease the magnitude of said error signal having a second polarity, (f) a source of bias current sufficient, when coupled to either of said magnetic amplifiers, to turn off either of said magnetic amplifiers when said error signal has an absolute magnitude less than a third predetermined value, said third predetermined value being greater than either said first or said second predetermined values, (g) a first RC circuit coupled to said first magnetic amplifier, said normally open second contact being connected between said first RC circuit and said source of bias current, the closing of said second contact serving to bias off said first magnetic amplifier when the absolute magnitude of said error signal falls below said third predetermined value and concurrently serving to charge up said first RC circuit so that on a subsequent opening of said second contact a charge will be left on said first RC circuit having a polarity such that the discharge of said first RC circuit through said magnetic amplifier will tend to maintain said first magnetic amplifier turned off, and (h) a second RC circuit coupled to second magnetic amplifier, said normally open fourth contact being connected between said second RC circuit and said source of bias current, the closing of said fourth contact serving to bias off said second magnetic amplifier when the absolute magnitude of the error signal drops below said third predetermined value and concurrently serving to charge up said second RC circuit so that on a subsequent opening of said fourth normally open contact a charge will be left on said second RC circuit having a polarity such that the discharge of said second RC circuit through said second magnetic amplifier will tend to maintain said second magnetic amplifier turned off.

17. The controller of claim 16 wherein the time constants of said first and said second RC circuits are at least equal to the time lag between a change in the position of said motor and the consequent change in the magnitude of said parameter.

18. In a servo system wherein a motor is employed to control a parameter of the controlled system and wherein an error signal is provided to indicate the magnitude and direction of deviation of said parameter from a desired magnitude, the improvement of a controller comprising:

(a) a tri-stable amplifier having an off state, a first on state and a second on state, said amplifier being adapted to be coupled to said error signal so that an error signal having a first polarity and an absolute magnitude greater than a first predetermined value will switch said amplifier into said first on state and an error signal having a second polarity and an absolute magnitude greater than a second predetermined value will switch said amplifier into said second on state, (b) a first relay coupled to said first on state of said amplifier and having first, second and third normally open contact, said first relay becoming energized to close the said first, second and third contacts when said amplifier is switched into said first on state, (c) a second relay coupled to said second on state of said amplifier and having fourth, fifth and sixth normally open contacts, said second relay becoming energized to close said fourth, fifth and sixth contacts when said amplifier is switched into said second on state, (d) a third relay being a time delay relay and having a seventh normally open contact, (e) a first source of power adequate to energize said third relay, said third and said sixth normally open contacts being connected between said first source of power and said third relay such that the closing of either said third or said sixth contact will energize said third relay to close said seventh normally open contact a first predetermined time period after said third or said sixth contact has closed, (f) a second source of power adequate to turn on said motor, said first and said seventh normally open contacts being connected in series between said motor and said second source of power so as to cause said motor to turn in a first direction when both said first and said seventh contacts are closed, said fourth and said seventh normally open contacts being connected in series between said source of power and said motor so as to cause said motor to turn in a second direction when both said fourth and seventh contacts are closed, the rotation of said motor in said first direction being such as would decrease the magnitude of an error signal having a first polarity and the rotation of said motor in said second direction being such as would decrease the magnitude of said error signal having a second polarity, (g) bias means adapted to switch said amplifier into said off state, said second and said fifth normally open contacts being connected between said bias means and said amplifier such that the closing of either of said second or said fifth contact will couple said bias means to said amplifier, (h) disabling means coupled to said bias means and responsive to the change of state of said third time delay relay to render said bias means incapable of switching off said amplifier until said first predetermined time period after said third relay has been energized so that said bias means will switch said amplifier into said off state only when both said first predetermined time period after energization of said third relay has elapsed and either of said second or said fifth constant is closed.

19. The controller of claim 18 wherein said third time delay relay has an eighth normally closed contact and wherein said disabling means includes a loading resistor connected in series with said eight contact, the series combination of said loading resistor and said eighth contact being connected across said bias means, said loading resistor having a resistance sufficiently low so that it loads said bias means when said eighth contact is closed to reduce the output voltage of said bias means sufficiently to render said bias means inoperative to switch said amplifier into said off state.

20. The controller of claim 18 further characterized by a charging capacitor connected across said bias means, the opening of said eighth contact serving to charge said capacitor to a point sufficient to switch said amplifier into said off state.

21. In a servo system wherein a motor is employed to control a parameter of a controlled system and wherein an error signal is provided to indicate the magnitude and direction of deviation of said parameter from a desired magnitude, the improvement of a controller comprising:

(a) a first magnetic amplifier coupled to said error signal such that said magnetic amplifier will be turned on by an error signal having a first polarity and having a magnitude greater than a first predetermined value, (b) a second magnetic amplifier coupled to said eror signal such said that magnetic amplifier will be turned on by an error signal having a second polarity and having a magnitude greater than a second predetermined value, (c) a first relay coupled to the output of said first magnetic amplifier and having first, second and third normally open contacts, said first relay becoming energized to close said first, said second and said third contacts when said first magnetic amplifier is turned on, (d) a second relay coupled to the output of said second magnetic amplifier and having a third, fourth and fifth normally open contacts, said second relay becoming energized to close said third, said fourth and said fifth contacts when said second amplifier is turned on, (e) a third relay being a time delay relay and having a seventh normally open contact and an eighth normally closed contact, (f) a first source of power adequate to energize said third relay, said third and said sixth normally open contacts being connected between said first source of power and said third relay such that the closing of either said third or said sixth contact will energize said third relay to close said seventh normally open contact a first predetermined time period after said third or said sixth contact has closed, (g) a second source of power adequate to turn on said motor, said first and said seventh normally open conatcts being connected in series between said motor and said second source of power so as to cause said motor to turn in a first direction when both said first and said seventh contacts are closed, said fourth and said seventh normally open contacts being connected in series between said source of power and said motor so as to cause said motor to turn in a second direction when both said fourth and seventh contacts are closed, the rotation of said motor in said first direction being such as would decrease the magnitude of an error signal having a first polarity and the rotation of said motor in said second direction being such as would decrease the magnitude of said error signal having a second polarity, (h) a source of bias current sufficient to turn off either of said magnetic amplifiers, said second contact being connected between said source and said first amplifier to couple said source to said first amplifier when said second contact is closed, said fifth contact being connected between said source and said second amplifier to couple said source to said second amplifier when said fifth contact is closed, (i) a resistor connected in series with said eighth normally closed contact, the series combination of said resistor and said eighth normally closed contact being connected across said source of bias current, said resistor having a resistance sufficiently low so that it will serve to load down said source of bias current when said eighth normally closed contact is closed to prevent said source from switching said amplifier into said off state, and (j) a charging capacitor connected across said source of bias current, the opening of said eighth contact serving to charge said capacitor to a point sufficient to switch either of said amplifiers into their off state.

References Cited

UNITED STATES PATENTS 2,475,217 7/1949 Bernas.
2,995,694 8/1961 Sorkin et al.

ORIS L. RADER, *Primary Examiner.*

T. E. LYNCH, *Assistant Examiner.*

U.S. Cl. X.R.

318—28, 448

U.S. DEPARTMENT OF COMMERCE
PATENT OFFICE
Washington, D.C. 20231

UNITED STATES PATENT OFFICE
CERTIFICATE OF CORRECTION

Patent No. 3,441,818                                    April 29, 1969

John R. Tiskus et al.

It is certified that error appears in the above identified patent and that said Letters Patent are hereby corrected as shown below:

Column 7, line 43, "buckling" should read -- bucking --. Column 8, line 7, "(R4)" should read -- (C4) --; line 56, "possible" should read -- possibly --. Column 19, line 60, "eror" should read -- error --; line 61, "said that" should read -- that said --.

Signed and sealed this 21st day of April 1970.

(SEAL)
Attest:

Edward M. Fletcher, Jr.                        WILLIAM E. SCHUYLER, JR.
Attesting Officer                                    Commissioner of Patents